United States Patent
Lasher

(10) Patent No.: US 8,348,293 B1
(45) Date of Patent: Jan. 8, 2013

(54) WHEELCHAIR WITH EASILY CHANGEABLE WHEEL SETS

(76) Inventor: William Lasher, Anchorage, AK (US)

( * ) Notice: Subject to any disclaimer, the term of this patent is extended or adjusted under 35 U.S.C. 154(b) by 370 days.

(21) Appl. No.: 12/661,525

(22) Filed: Mar. 17, 2010

(51) Int. Cl.
*B62M 1/14* (2006.01)

(52) U.S. Cl. .......................................... 280/250.1; 16/30

(58) Field of Classification Search ............... 280/250.1; 16/30
See application file for complete search history.

(56) References Cited

U.S. PATENT DOCUMENTS

| | | | | |
|---|---|---|---|---|
| 3,337,228 | A * | 8/1967 | Shulkin | 280/47.27 |
| 5,267,745 | A * | 12/1993 | Robertson et al. | 280/250.1 |
| 5,361,494 | A * | 11/1994 | Robertson et al. | 29/897.2 |
| 5,409,247 | A * | 4/1995 | Robertson et al. | 280/250.1 |
| 5,590,893 | A * | 1/1997 | Robinson et al. | 280/250.1 |
| 6,270,105 | B1 * | 8/2001 | Friedrich | 280/281.1 |
| 7,162,772 | B2 * | 1/2007 | Asher | 16/29 |
| 7,766,342 | B2 * | 8/2010 | Fast et al. | 280/5.28 |
| 8,002,363 | B2 * | 8/2011 | Cheng | 301/111.06 |

\* cited by examiner

*Primary Examiner* — Kevin Hurley

(74) *Attorney, Agent, or Firm* — Michael J. Tavella

(57) ABSTRACT

A wheelchair that has the ability to change quickly and easily the front casters of the wheelchair to another set of front casters intended for a different usage. This usage includes: an 'everyday' chair set up that uses narrower rear tires and smaller front casters; a snow chair set up with wide rear tires and larger front casters (or skis in place of casters); a beach set up with extremely wide rear tires and balloon front casters placed forward of the front of the frame; a hiking set up with mountain bike rear tires and over sized youth mountain bike front casters set); or a beach set up with extremely wide rear tires and balloon front casters placed forward of the front of the frame. A user may also mix and match front casters and rear wheels to form a different combination not listed above.

12 Claims, 11 Drawing Sheets

WHEELCHAIR WITH EASILY CHANGEABLE WHEEL SETS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to wheelchairs and particularly to wheelchairs with easily changeable wheel sets.

2. Description of the Prior Art

Wheelchairs have been used for centuries. At present, they have one thing in common: the wheel sets-especially the front wheel castors have been typically fixed on the chair. Many wheelchairs today have removable rear wheels, but this is done mostly to accommodate transport. With the wheels removed, wheel chairs can be more easily placed in car trunks, for example. However, no wheelchairs today have the ability to be converted for other uses by simply changing the wheels=both rear and front-to enable the chair to be used on sand or snow, for example.

BRIEF DESCRIPTION OF THE INVENTION

The instant invention is designed to fill an area of the wheelchair market that has yet to be addressed: the ability to quickly and easily change rear wheels and, more importantly, the front casters of a wheelchair to another set of rear wheels and front casters intended for a different usage. This usage includes, but is not limited to: an 'everyday' chair set up that uses narrower rear tires and smaller front casters; a snow chair set up with wide rear tires and larger front casters (or skis in place of casters that are placed forward of the front of the frame); a beach set up with extremely wide rear tires and balloon front casters placed forward of the front of the frame; a hiking set up with mountain bike rear tires and over sized youth mountain bike front casters set forward of the chair frame; and a light trail/grass/gravel set up with light mountain bike rear tires and larger sized casters placed in line with the front of the frame. Along with all the various uses, a user may also mix and match front casters and rear wheels to form a different combination not listed above, e.g., beach style rear wheels with skis for front casters for use in deeper snow conditions.

As discussed above, while wheelchairs have used quick-release rear wheels for a long time, there are no wheelchairs currently on the market where the entire caster and frame mount assembly detaches from the frame. The instant invention involves a quick release mechanism in which the caster, caster fork, and bearings mount to the front of the frame and are aligned on the frame with the use of a permanent frame piece used to set the proper height and alignment of the assembly. This mounting system allows the user to quickly and easily change the front caster and fork assembly of their chair for the required set up for the intended use, e.g., beach, snow, gravel, grass, hiking trail, etc.

DETAILED DESCRIPTION OF THE INVENTION

Figure 1:
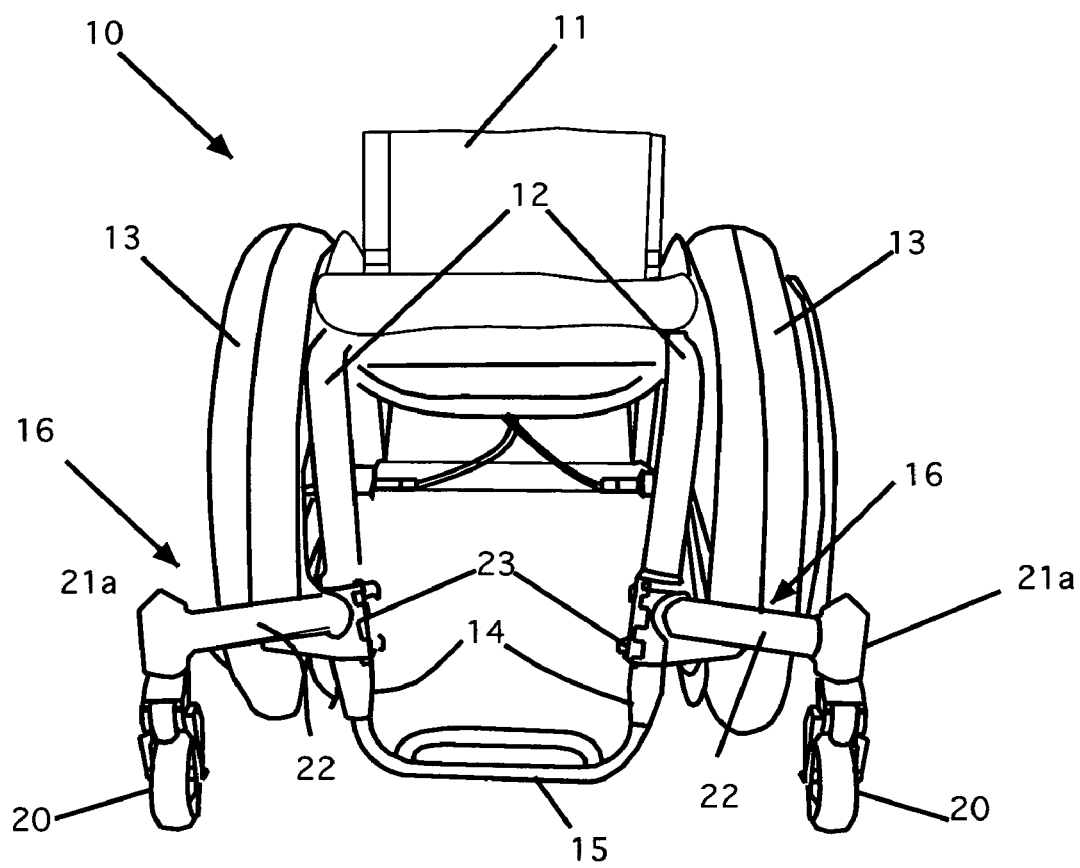
FIG. 1 is a front view of a custom wheelchair with narrow front casters.

Referring now to FIG. 1, a front view of a custom wheelchair with narrow front casters is shown. In this design, the wheelchair 10 has a seat portion 11, a frame 12, and two rear wheels 13. Unlike standard wheel chairs, the frame 12 has a pair of caster forks 14 that extend downward in the front of the chair. The caster forks 14 have a footrest 15 attached as shown. Note that the front casters are not simply fixed to the forks. Rather, the front casters are made up of an assembly 16.

Each front caster assembly 16 consists of a caster 20, which in this case is a narrow caster for "everyday" use. The caster is secured in a caster arm 21 that has an end piece 21a into which the caster is secured and is considered to be a caster retainer, and an extension piece 22 that holds the caster away from the wheelchair frame. This extension piece allows different sized casters, and even skis to the attached to the wheelchair without interference. The extension piece 22 terminates at a hinged quick release mechanism 23. Details of this mechanism are discussed below. The advantage of this device is that along with the rear wheels, the front casters can be quickly and easily removed is that different sized wheels and other accessories can be added to the chair as desired.

Figure 2:
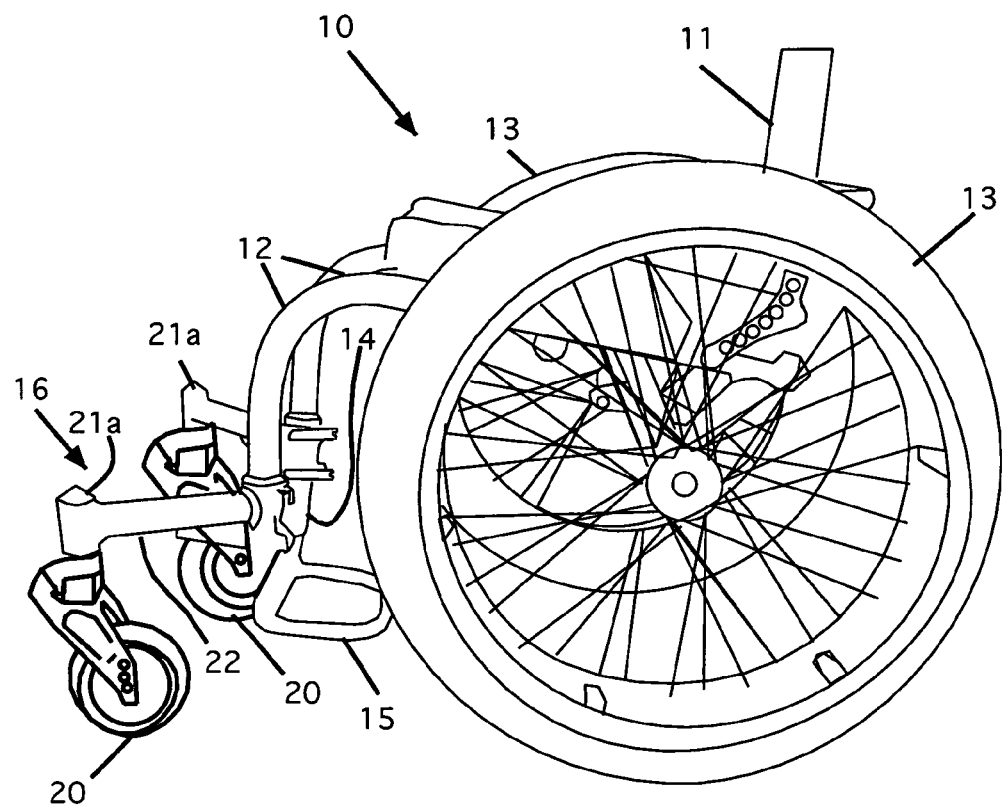
FIG. 2 is a side view of a custom wheelchair with narrow front casters.

FIG. 2 is a side view of a custom wheelchair with narrow front casters. Here, the seat portion 11, a frame 12, and two rear wheels 13 are shown. In addition, the pair of caster forks 14 and footrest 15 are shown, as well as the front caster assembly 16 as discussed above. In this view, the extension pieces 22 shows how the casters are moved forward of the chair.

Figure 3:
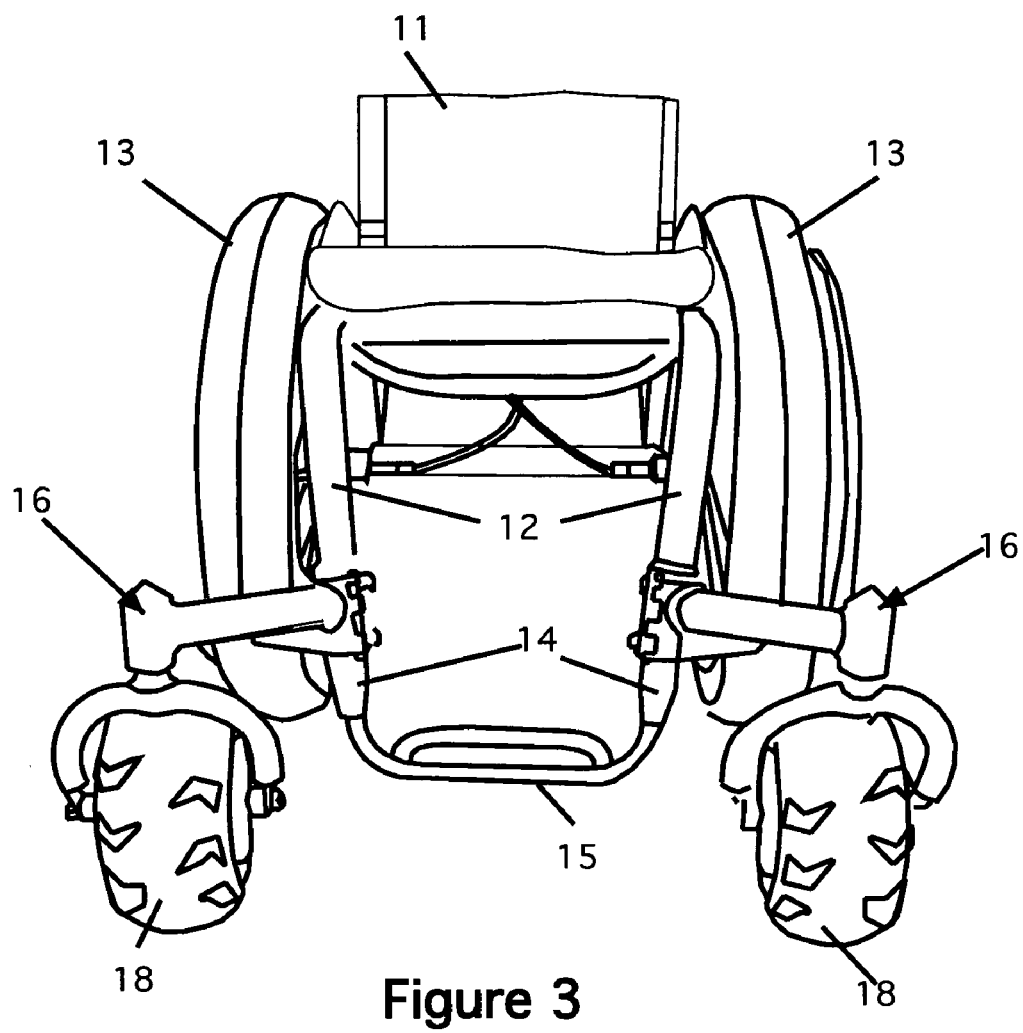
FIG. 3 front view of a custom wheelchair with wide front casters.
Figure 4:
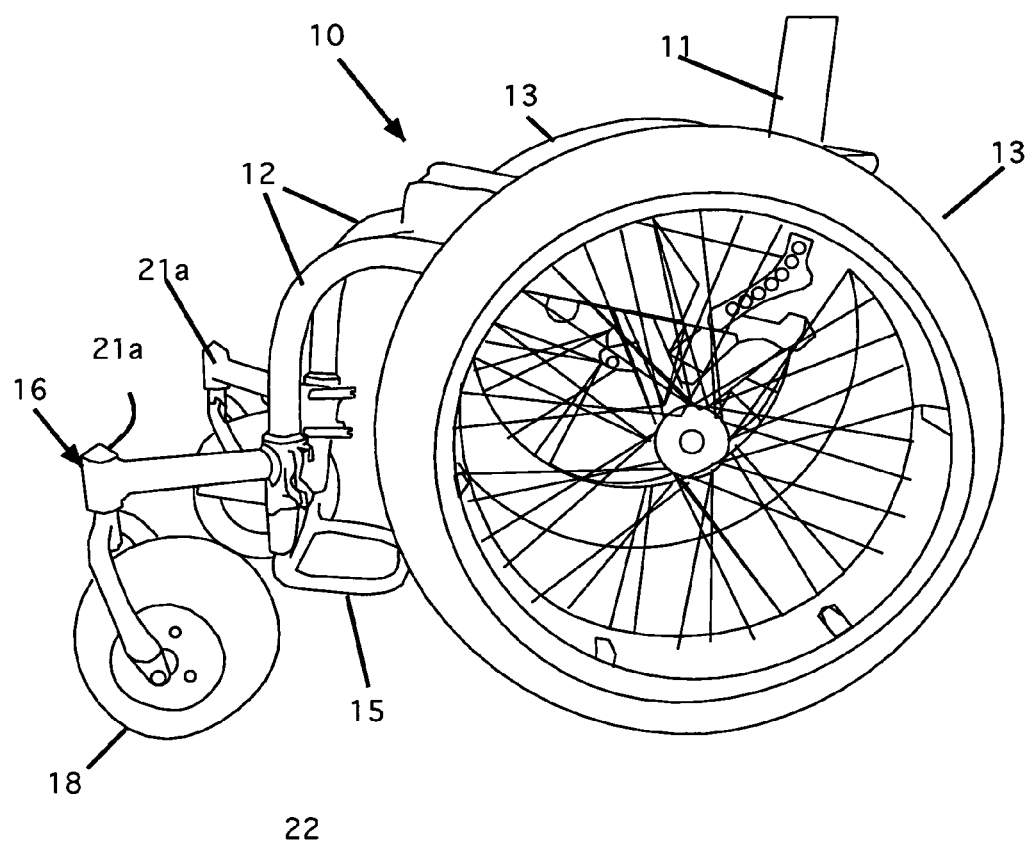
FIG. 4 is a side view of a custom wheelchair with wide front casters.

FIG. 3 is a front view of a custom wheelchair with wide front casters. FIG. 4 is a side view of a custom wheelchair with wide front casters. In these views, the seat portion 11, a frame 12, and two rear wheels 13, the pair of caster forks 14 and footrest 15 are identical to that of FIGS. 1 and 2. The difference is that the front wheels 18 are wide to permit use on soft surfaces like sand or snow or trails. Note that the caster assembly 16 is the same.

Figure 5:
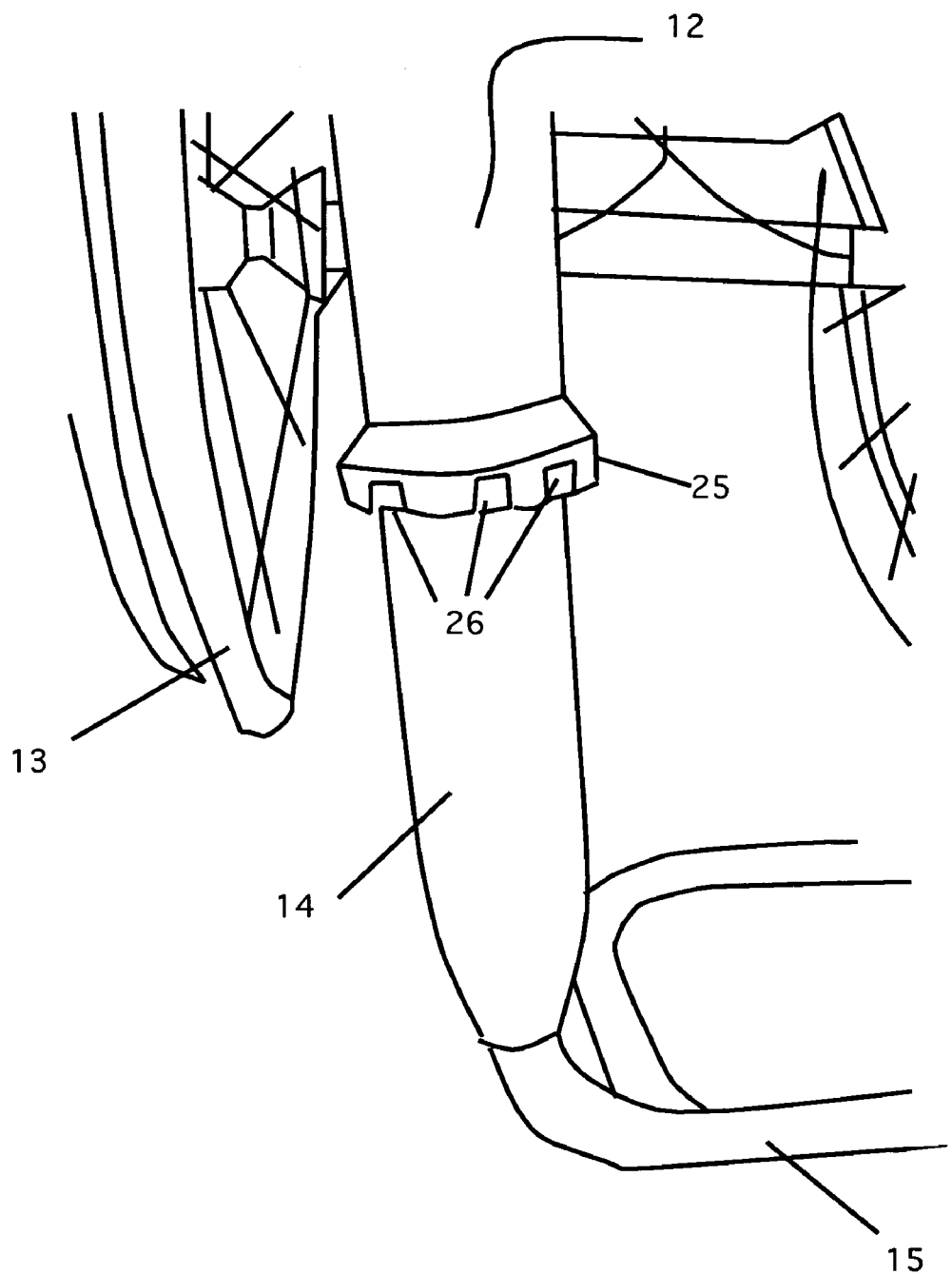
FIG. 5 is a detail of the caster fork with the caster removed.

FIG. 5 is a detail of the caster fork with the caster removed. One of the key components of the invention is the front caster fork 14. One of the two forks is shown in the drawing. The fork descends from the frame 12. At the top of the fork piece there is a locking ring 25 that has a number of notches 26 formed therein. These notches hold the quick release portion of the caster assembly. The notches act to prevent the caster from turning about the fork when it is in place. The fork extends downward, tapering near the base to smoothly meet the footrest 15. The quick release portion 23 of caster assembly is attached to the upper portion below the locking ring as shown and discussed below.

Figure 6:
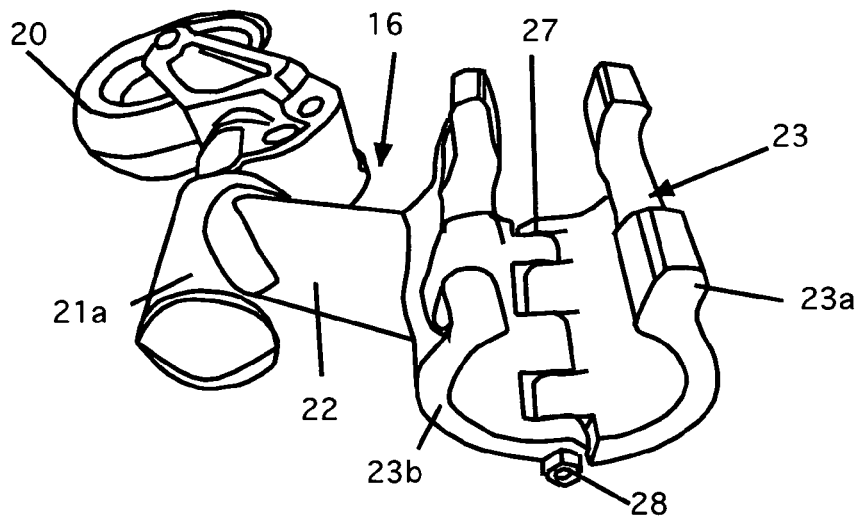
FIG. 6 is a detail of a narrow front caster showing the release mechanism opened.

FIG. 6 is a detail of a narrow front caster showing the release mechanism opened. In this figure, the caster assembly 16 is shown lying flat with the release portion open. The quick release portion 23 is made of two parts 23a and 23b that are joined to form a hinge at 27. As discussed below, quick release portion 23 has two cam locks 28 that are used to secure the quick release portion 23 to the caster fork.

The hinge is formed with a pin and a fastener 28 as shown. In use, the hinge is opened and positioned on the caster fork 14. It is then closed and the cam locks are pressed down to secure the caster assembly in place.

Figure 8:
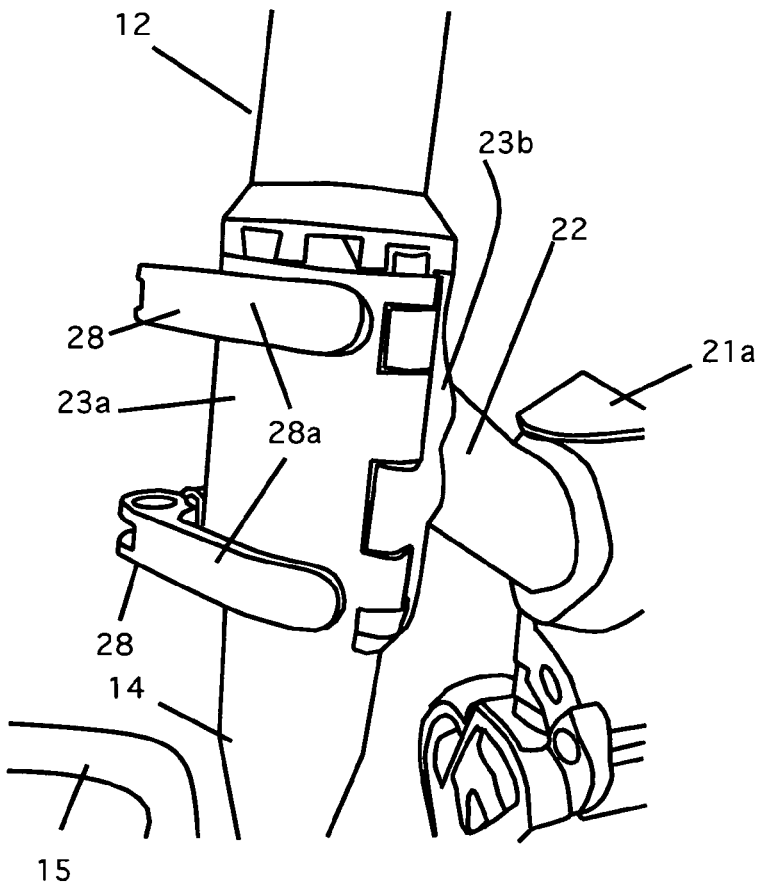
FIG. 8 is a close up detail of FIG. 7 of the caster fork showing a caster in place.
Figure 7:
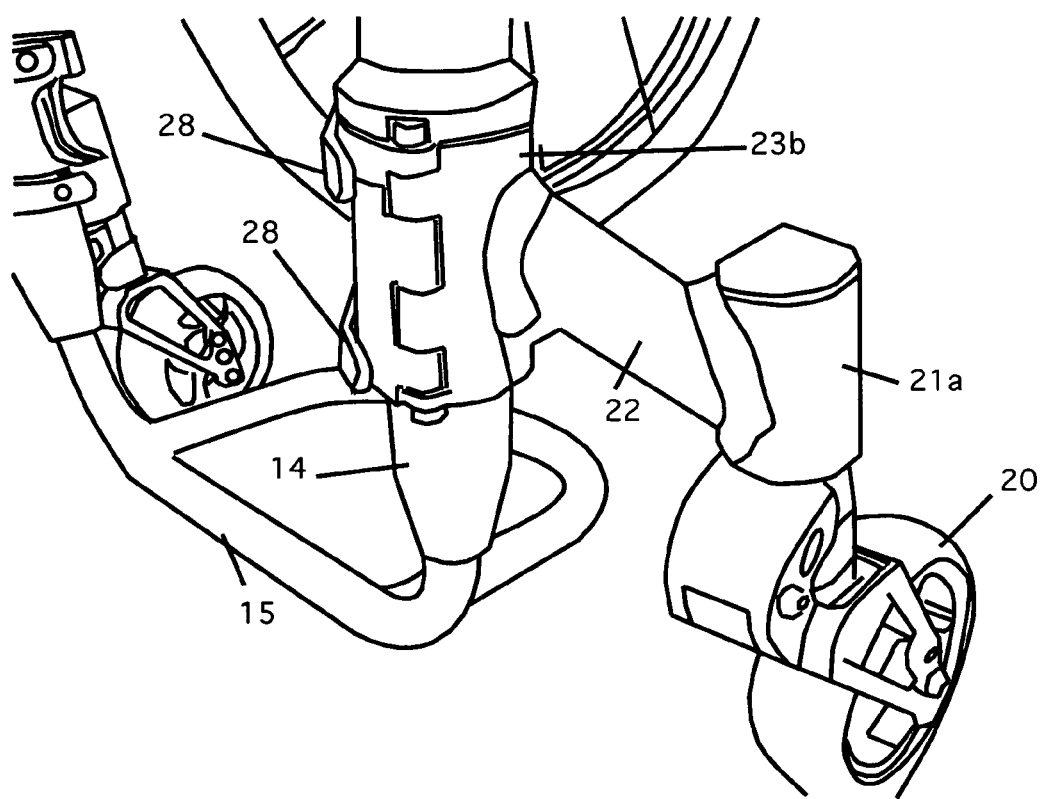
FIG. 7 is a detail of the caster fork showing a caster in place.

FIG. 7 is a detail of the caster fork showing a caster in place. FIG. 8 is a close up detail of FIG. 7 of the caster fork showing a caster in place. In these views, the caster assembly 16 is secured to the caster fork 16. Note that the cam locks 28 are secure against the quick release portion. This ensures that the caster assembly is securely attached to the caster fork.

Figure 9:
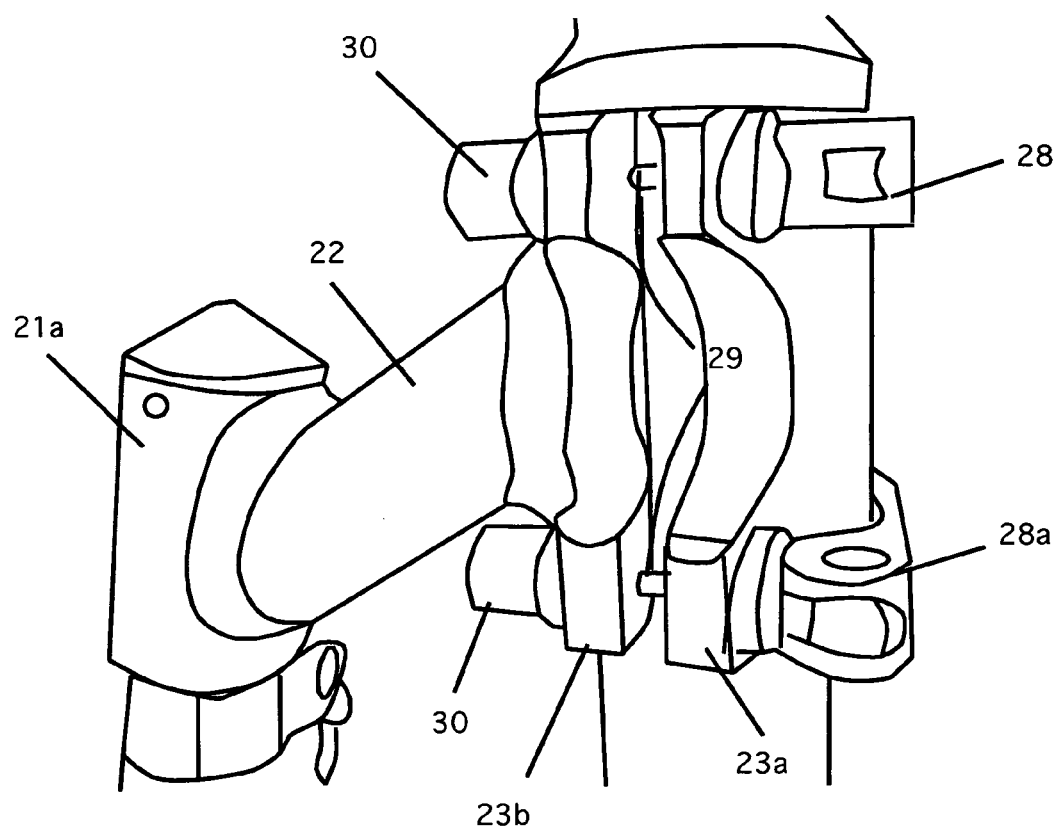
FIG. 9 is a detail of the rear of the caster release mechanism.

FIG. 9 is a detail of the rear of the caster release mechanism. In this view, the open portions 23a and 23b of the hinge are shown. The cam locks 28 are shown in the locked position. These locks have a handle portion 28a and a curved cam portion 28b. The cam portion is attached to a bolt 29 that passes through the hinge ends 23a and 23b. The bolts 29 are secured by adjusting nuts 30. These nuts allow the user to tighten or loosen the force of the cam locks, as desired. In operation, the cam locks are opened (see FIG. 10). The hinge is closed about the caster fork. The cam locks are then rotated into the closed position, where the curved cam portions 28b cause the hinge to be tightened about the caster fork, thereby securing the caster assembly in place. To remove the caster assembly, the procedure is simply reversed.

Figure 10:
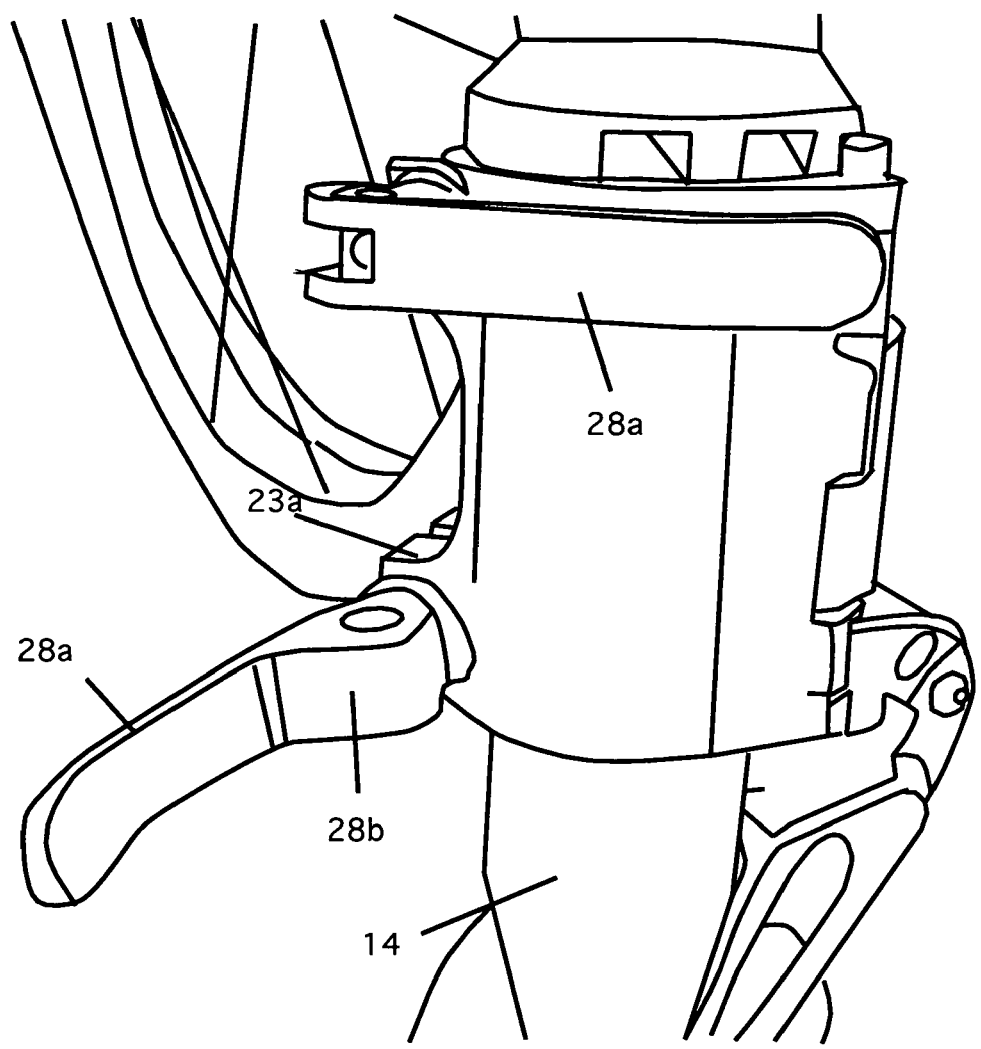
FIG. 10 is a detail of the front of the quick release mechanism, showing one of the release arms in the open position.

FIG. 10 is a detail of the front of the quick release mechanism, showing one of the release arms in the open position. Here, the lower cam lock 28 is open. The handle 28a is swung outward from the quick release portion. In this position, the cam exerts no force on the quick release portion. The other is shown locked.

Figure 11:
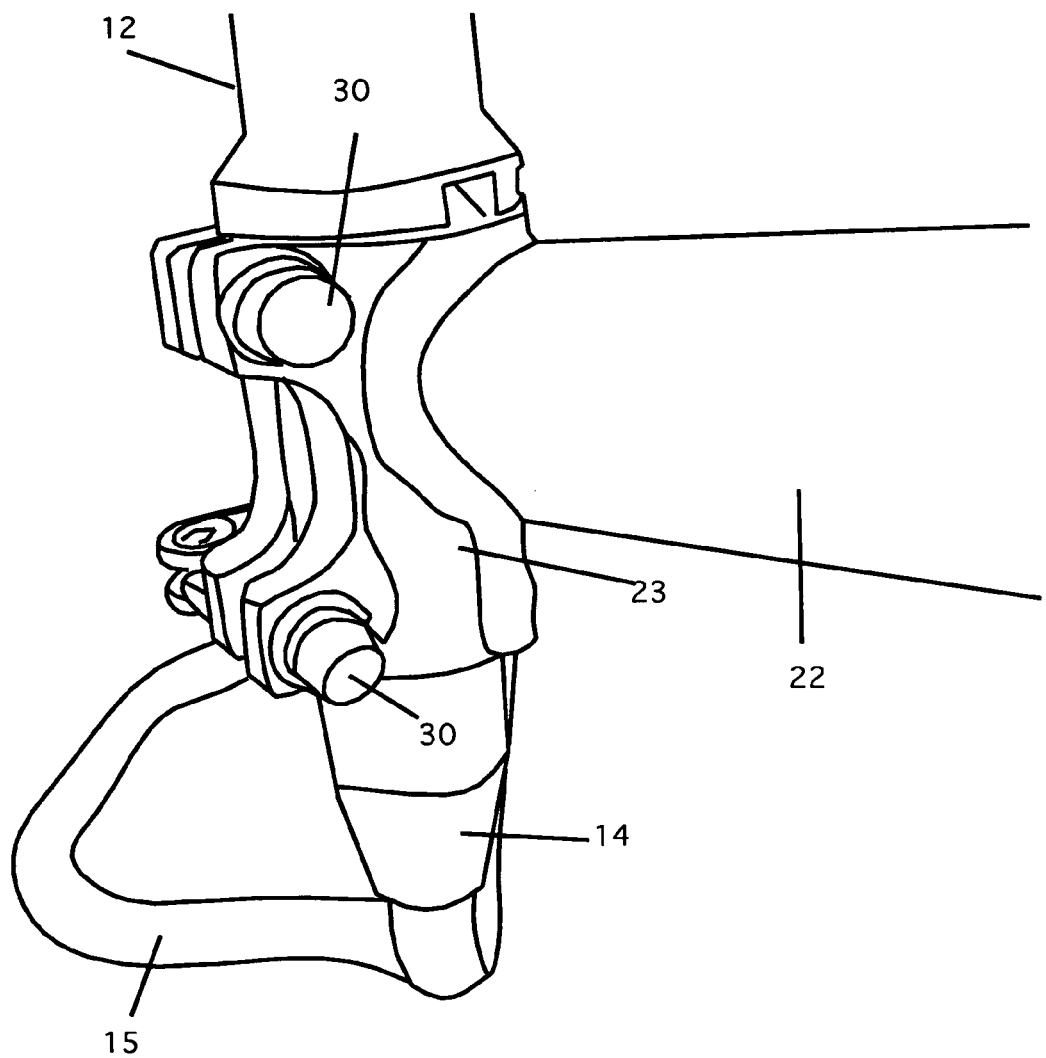
FIG. 11 is a detail of the rear of the quick release mechanism as mounted on the caster fork.

FIG. 11 is a detail of the rear of the quick release mechanism as mounted on the caster fork. This figure shows the adjusting nuts 30 more clearly.

Figure 12:
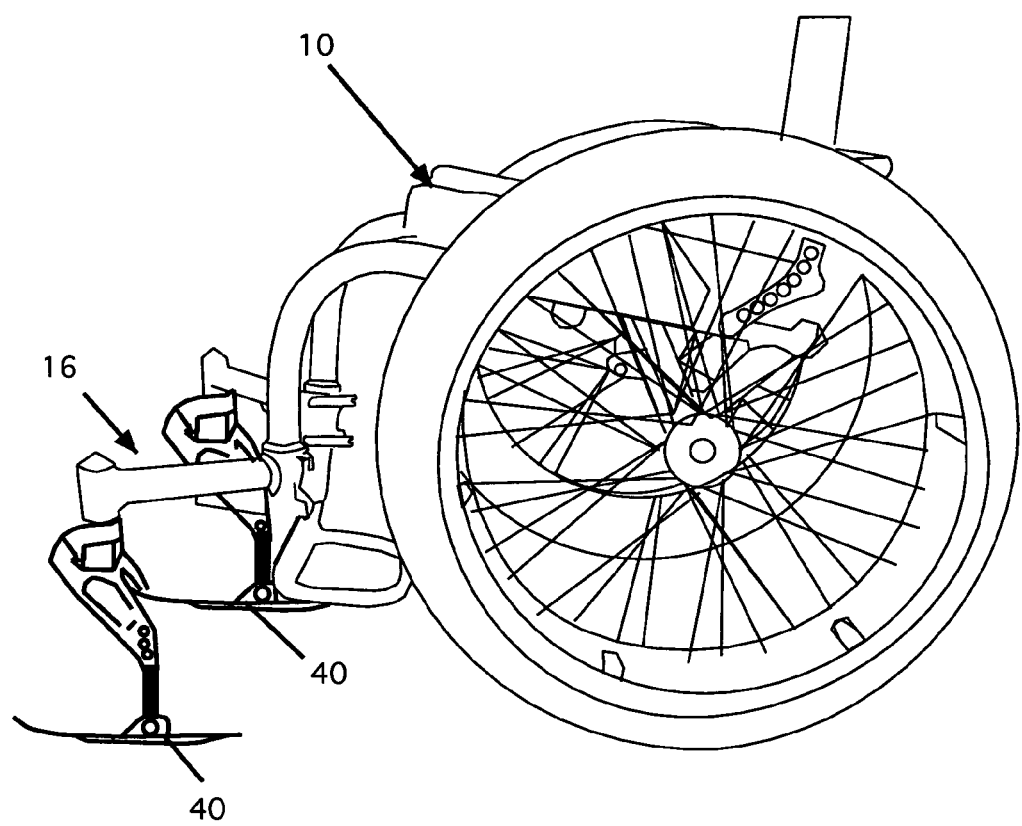
FIG. 12 is a side view of a custom wheelchair with skis in place of front casters.

Finally, FIG. 12 is a side view of a custom wheelchair with skis in place of front casters. As noted above, one option is to add skis to the wheelchair instead of front casters. This figures shows skis 40 installed. Note that the skis are designed to pivot as they traverse the ground.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A wheelchair having a seat portion, a frame and a pair of rear wheels, each of said pair of rear wheels having a width, comprising:
   a) a pair of front caster forks, extending downwardly from said frame;
   b) a pair of front caster assemblies, removably attached to said pair of front caster forks; and
   c) a means for quickly releasing and installing said pair of front caster assemblies on said front caster forks, attached to said pair of front caster assemblies, said means for quickly releasing including at least one cam lock, operably installed on said each of said pair of front caster assemblies.

2. The wheelchair of claim 1 wherein each of said pair of caster assemblies includes a caster wheel having a width less than the width of one of said pair of rear wheels.

3. The wheelchair of claim 1 wherein each of said pair of caster assemblies includes a caster wheel having a width greater than the width of one of said pair of rear wheels.

4. The wheelchair of claim 1 wherein each of said pair of caster assemblies includes a ski.

5. The wheelchair of claim 1 wherein each of said front caster assemblies comprises:
   a) a caster;
   b) a caster arm, said caster arm having an end piece into which the caster is secured, and an extension piece caster away from the wheelchair frame; and
   c) a quick release mechanism, attached to said caster arm.

6. The wheelchair of claim 5 wherein the quick release mechanism comprises:
   a) a first hinge section, attached to said extension arm;
   b) a second hinge section, hingably attached to said first hinge section;
   c) wherein said first and second hinge sections each have an open end having at least one hole therein;
   d) said at least one cam lock having an extension handle and a curved cam piece;
   e) a bolt, secured to the curved cam piece, wherein said bolt is passed through the at least one hole in said open ends of both said first and second hinge sections; and
   f) an adjusting nut, secured to said bolt.

7. A wheelchair having a seat portion, a frame and a pair of rear wheels, each of said pair of rear wheels having a width, comprising:
   a) a pair of front caster forks, extending downwardly from said frame; and
   b) a pair of front caster assemblies, removably attached to said pair of front caster forks, wherein each of the front caster assemblies has
   i) a caster retainer;
   ii) an extension piece, attached to said caster retainer, and extending outward therefrom;
   iii) a quick release mechanism, attached to said extension piece, including at least one cam lock, operably installed on said each of said pair of front caster assemblies; and
   iv) a caster wheel rotatably attached to said caster retainer.

8. The wheelchair of claim 7 where each caster wheel has a width less than the width of one of said pair of rear wheels.

9. The wheelchair of claim 7 where each caster wheel has a width greater than the width of one of said pair of rear wheels.

10. The wheelchair of claim 7 where each caster wheel is a ski.

11. The wheelchair of claim 7 wherein the quick release mechanism comprises:
   a) a first hinge section, attached to said extension arm;
   b) a second hinge section, hingably attached to said first hinge section;

c) wherein said first and second hinge sections each have an open end having at least one hole therein;

d) said at least one cam lock having an extension handle and a curved cam piece;

e) a bolt, secured to the curved cam piece, wherein said bolt is passed through the at least one hole in said open ends of both said first and second hinge sections; and f) an adjusting nut, secured to said bolt.

12. The wheelchair of claim 11 further comprising:

a) a second cam lock having an extension handle and a curved cam piece;

b) a second bolt, secured to the curved cam piece, wherein said bolt is passed through a second hole formed in said open ends of both said first and second hinge sections; and c) a second adjusting nut, secured to said second bolt.

\* \* \* \* \*